United States Patent [19]

Ohtsuki et al.

[11] 4,363,049

[45] Dec. 7, 1982

[54] METHOD AND APPARATUS FOR EDITING DIGITAL SIGNALS

[75] Inventors: Tadashi Ohtsuki, Kanagawa; Shinichi Kazami, Tokyo; Shinji Anjyu, Saitama; Masato Tanaka, Tokyo, all of Japan

[73] Assignee: Sony Corporation, Tokyo, Japan

[21] Appl. No.: 154,525

[22] Filed: May 29, 1980

[30] Foreign Application Priority Data

May 31, 1979 [JP] Japan ............................. 54-68201
Jun. 7, 1979 [JP] Japan ............................. 54-71539
Jun. 7, 1979 [JP] Japan ............................. 54-71540

[51] Int. Cl.$^3$ ........................ G11B 27/02; G11B 5/00
[52] U.S. Cl. ..................................... 360/13; 360/32
[58] Field of Search ................................. 360/13, 32

[56] References Cited

U.S. PATENT DOCUMENTS 4,187,544  2/1980  Lerner ................................. 360/13
4,211,997  7/1980  Rudnick et al. ..................... 360/13
4,249,218  2/1981  Davis et al. ......................... 360/13

Primary Examiner—Vincent P. Canney
Attorney, Agent, or Firm—Lewis H. Eslinger; Alvin Sinderbrand

[57] ABSTRACT

In a method and apparatus for editing digital signals, such as PCM-encoded audio signals, which are helically recorded on a magnetic tape in a Video Tape Recorder, first and second digital signals to be edited are reproduced in order to determine the respective edit points, and a predetermined interval of either one of the first and second digital signals is stored in a memory, with such predetermined interval including the respective edit point. During an editing operation, the digital signals from the memory are inserted between the first and second digital signals, and thereby the first and second digital signals can be recorded on an editing tape without discontinuities at the desired edit points.

12 Claims, 27 Drawing Figures

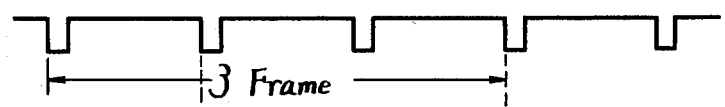
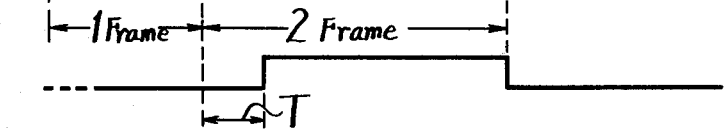
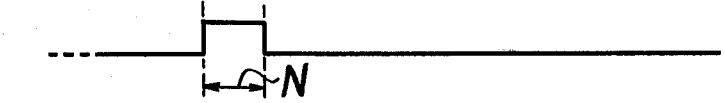
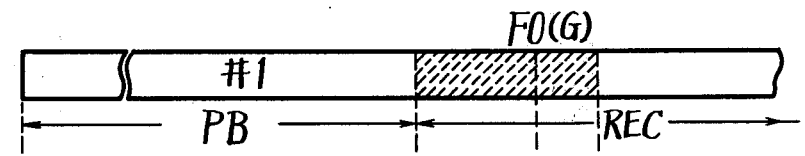
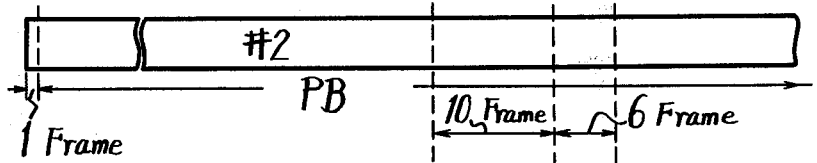

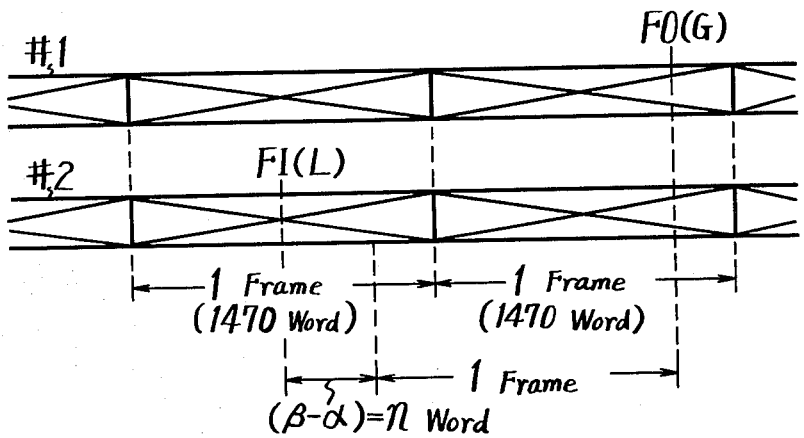
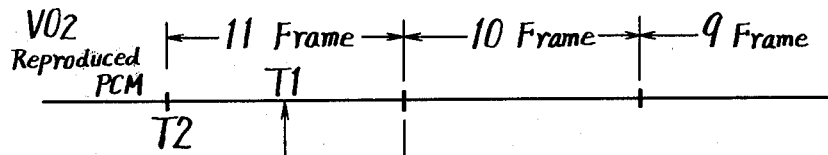
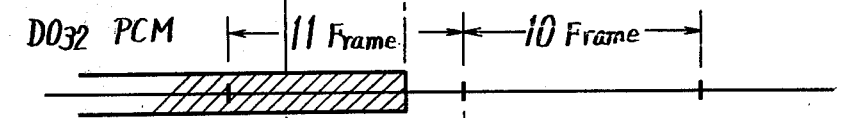
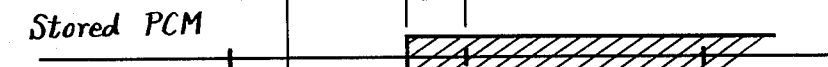
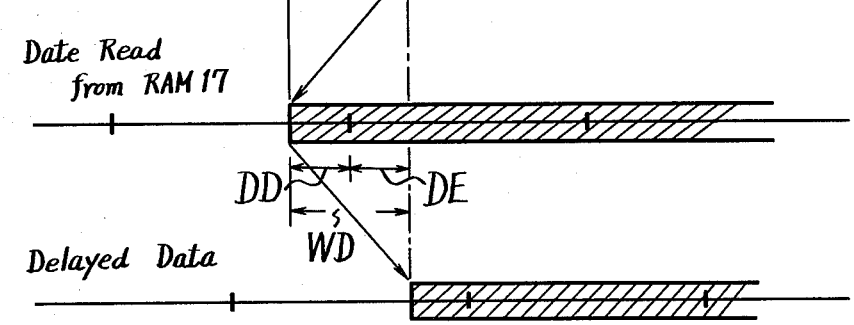

METHOD AND APPARATUS FOR EDITING DIGITAL SIGNALS

BACKGROUND OF THE INVENTION

1. Field of the Invention

This invention relates to a method and apparatus for editing digital signals which are recorded on a record medium and, more particularly, to such a method and apparatus for electronically editing digital signals, such as PCM-encoded audio signals, which are helically recorded on a magnetic tape by a conventional VTR.

2. Description of the Prior Art

In the field of magnetic recording, two types of editing are well-known; physical editing, wherein information recorded on one magnetic tape, such as audio information, and information recorded on another magnetic tape are combined by splicing the two tapes together; and electronic editing, wherein information from a separate source is combined electronically with information previously recorded on a magnetic tape. The physical editing technique generally is used when the information recorded on the magnetic tape is relatively low frequency information, such as recorded audio signals.

Generally, electronic editing is used when the information recorded on the magnetic tape is relatively high frequency information, such as video signals. In electronic editing, edit signals, which may be supplied from a suitable source, such as another record medium, a suitable memory device, or the like, are inserted or assembled with original information. For example, original information on one record medium may be re-recorded onto another record medium until a suitable edit point is reached. Thereafter, the edit information is substituted for the original information, and this substituted edit information is recorded on the second record medium. Subsequently, the original information is re-corded once again on the second record medium, resulting in the edit information being "inserted" into the original information. Electronic editing often is used in preparing video tape to be played back or reproduced for broadcast purposes.

Recently, high quality audio recordings have been made by digitally encoding the audio signals to, for example, a pulse code modulation (PCM) format and then recording such PCM-encoded audio signals. For example, left and right channel audio signals are sampled, encoded in PCM form, and the PCM signals are helically recorded on a magnetic tape by a conventional video tape recording or VTR device. However, it is not possible to edit the audio PCM signals in the same manner as has been used for editing video signals while being played back and recorded with VTRs. It is because electronic audio signal editing device must be provided with the following functions:

Firstly, when determining an edit point, it must be possible to detect the location of the edit point with an accuracy that is substantially the same as that possible with an analog recorder; secondly the editing accuracy has to be finer than the frame (or field) unit or finer than 1/100 second; thirdly, it must be possible to remove any discontinuity of the signals at the edit point; and fourthly, the rehearsal must be capable of being carried out with an accuracy substantially the same as that attained upon editing.

OBJECTS AND SUMMARY OF THE INVENTION

Accordingly, it is an object of the present invention to provide a novel method and apparatus which can perform the above mentioned functions.

In the case where two PCM signal recording and reproducing devices are used to achieve electronic editing with the reproduced PCM signal from the reproducing device being recorded in the recording device as a continuation of a PCM signal already recorded therein, after the two PCM signal recording and reproducing devices are returned to the positions before the edit point by preroll, the two devices are changed over to their reproducing state and then the two devices are synchronously driven to achieve synchronizing of the PCM signal already recorded with a PCM signal to be newly recorded commencing at the edit point. It is difficult to achieve such synchronizing by controlling the running speed of the recording medium in one of the two PCM signal recording and reproducing devices, particulary with the prior art VTR provided with an external adapter including a circuit block for affecting PCM modulation, PCM demodulation or the like.

Accordingly it is another object of the invention to provide a method and apparatus, in which deviation in synchronism between a PCM signal already recorded and a PCM signal to be newly recorded is detected and the PCM signal to be newly recorded is delayed in response to the detected deviation to present the synchronous relation between the PCM signals at the edit point.

In determining the synchronous relation of video signals, it is the general practice to employ the frame (or field) unit. However, poor editing accuracy results when an audio signal is pulse-code-modulated to be a PCM signal and the synchronization of the PCM signals is established with reference to the frame unit (1/30 second).

Thus, it is a further object of the invention to provide a method and apparatus which can establish synchronization of high accuracy and hence achieve the editing of PCM signals with high accuracy by the use of a delay process employing a digital memory.

BRIEF DESCRIPTION OF THE DRAWINGS

The following detailed description, given by way of example, will best be understood in conjunction with the accompanying drawings in which:

FIGS. 8A–8F are waveform charts which are used for explanation of the operation of the delay detection circuit of FIG. 7;

FIGS. 9A–9D, 10A and 10B, and 11A–11E are diagrammatic representation of magnetic tapes which are used for explanation of the editing apparatus of this invention.

DESCRIPTION OF THE PREFERRED EMBODIMENTS

Figure 1:
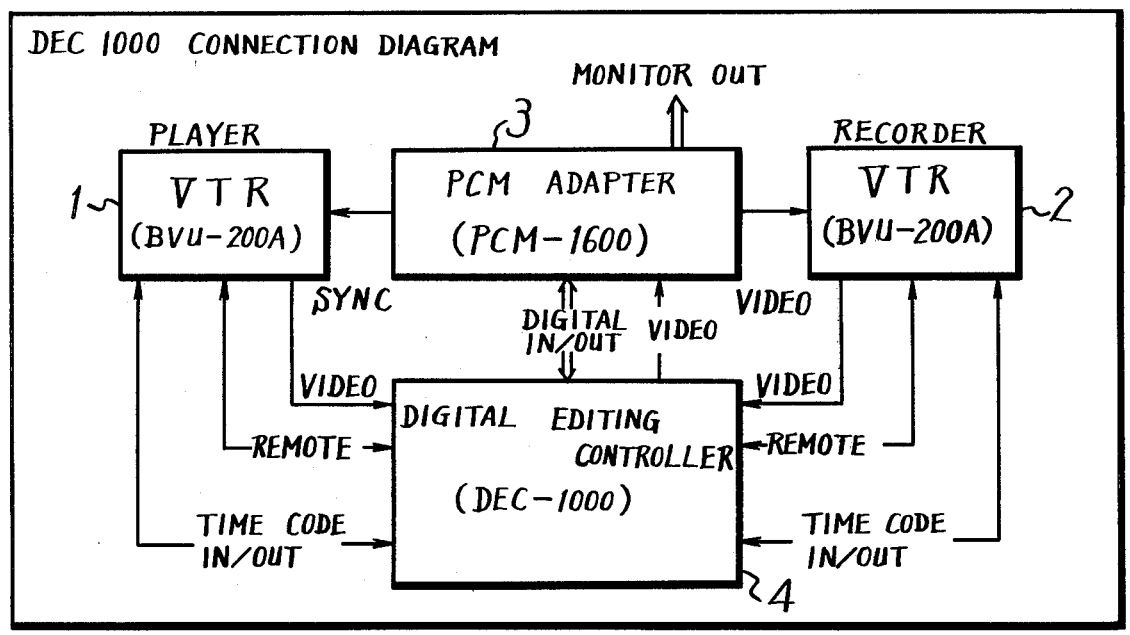
FIG. 1 is a block diagram showing the major components of an editing apparatus in accordance with the present invention.

Referring initially to FIG. 1, electronic editing is there shown to be achieved by two VTRs 1 and 2, each being of a helical scan type, a PCM adapter 3, an editing controller 4, to which the present invention is applied, and a monitor speaker (not shown in FIG. 1) connected to the PCM adapter 3. The PCM adapter 3 may be constituted by a PCM-1600 manufactured by SONY Corp. and each of VTRs 1 and 2, may be a SONY VTR BVU-200A.

Figure 2A:
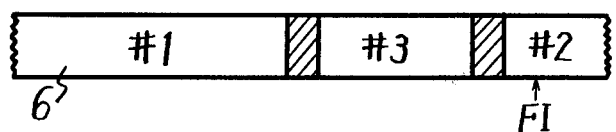
FIGS. 2A, 2B and 2C are diagrammatic representations of magnetic tapes to which reference will be made in explaining how an editing operation has been carried out.
Figure 2B:
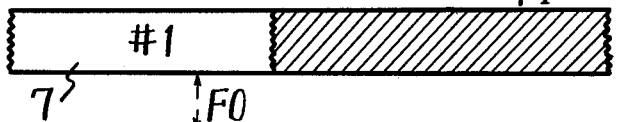
Figure 2C:
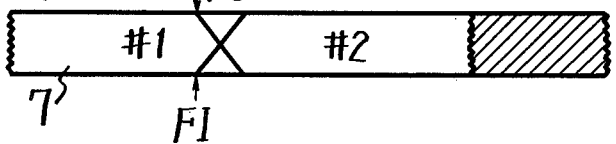

As an example of the electronic editing, the case will be considered in which a master tape 6, on which a plurality of programs are recorded as shown in FIG. 2A, is reproduced by the player VTR 1 and an editing tape 7, such as is shown in FIG. 2C, is prepared by the recoder VTR 2. More particularly, a program marked with #1 is recorded on editing tape 7 over a rather long length by the VTR 2 as shown in FIG. 2B, then a desired fade-out edit point FO of tape 7 is determined, and a desired fade-in edit point FI of master tape 6 is determined. Thereafter, while the master tape 6 is being reproduced by the VTR 1, the VTR 2 is changed over into its recording state to record on tape 7 the PCM signal which is cross-fade-processed from the No. 1 (#1) program to the No. 2 (190 2) program at the edit points FO and FI.

Figure 3:
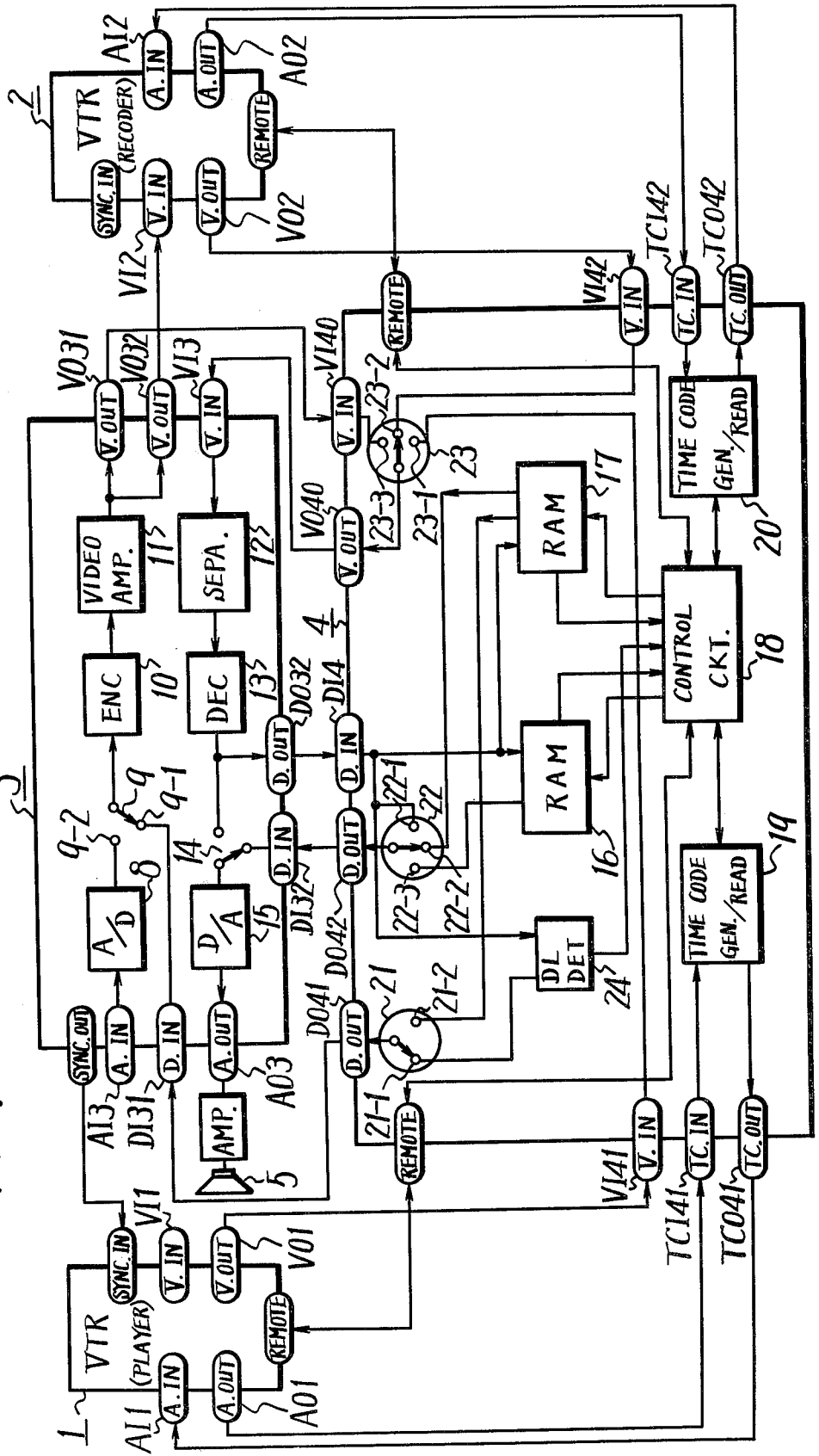
FIG. 3 is a detailed block diagram of editing apparatus in accordance with an embodiment of the present invention.

FIG. 3 as is shown on the VTRs 1 and 2 are provided with audio input terminals VI1, VI2, audio output terminals VO1, VO2, remote control terminals (REMOTE) and synchronous input terminals (SYNC IN), respectively. The remote control terminals (REMOTE) are connected to the similarly identified remote control terminals of editing controller 4, respectively, so that the operations of VTRs 1 and 2 can be remotely controlled by control signals from the editing controller 4. The synchronizing signal (SYNC OUT) from PCM adapter 3 is fed to the synchronous input terminal, (SYNC IN) of player VTR 1 to establish the synchronization between the PCM adapter 3 and player VTR 1. This player VTR 1 reproduces the master tape 6 and produces a PCM signal in the form of a video signal at its video output terminal VO1. The recorder VTR 2 functions to reproduce the PCM signal which is already recorded on the editing tape 7 and delivers such reproduced PCM signal to its video output terminal VO2, and VTR 2 further functions to record on tape 7 the PCM fed to its video input terminal VI2. On the audio tracks of master and editing tapes 6 and 7, SMPTE time codes are respectively recorded and such time codes can be also reproduced. Thus, at audio output terminals AO1 and AO2 of VTRs 1 and 2, reproduced time codes are obtained, and the time codes to be recorded are respectively fed to audio input terminals AI1 and AI2 of VTRs 1 and 2. The PCM adapter 4 may be as shown in detail in U.S. Pat. No. 4,138,694 having the same assignee as this application. Conventionally, as shown in FIG. 3, the PCM adapter 3 is provided with an analog-digital converter 8, an encoder 10 and a video amplifier 11 for the recording operation, and a sync (synchronizing) signal separator 12, a decoder 13 and a digital-analog converter 15 for the reproducing operation. The PCM adapter shown in FIG. 3 is particularly provided with an editing switch 9 and a monitor switch 14 in order to effect the editing operation between the player VTR 1 and the recorder VTR 2. During the editing operation, the switch 9 is controlled so that the digital signal applied to a data input terminal DI31 of PCM adapter 3 is supplied directly to the encoder 10. On the other hand, the switch 14 is provided to select the digital signals to be monitored among the output of the decoder 13 and the signal applied to a data input terminal DI32 of PCM adapter 3. The digital signal selected by the switch 14 is converted to the corresponding analog signal in the converter 15, and the analog signal is monitored, as by a monitor speaker 5.

In the example of FIG. 3, the signal path for only a single channel signal is shown, but in order to process a stereo-audio signal a PCM portion and a demodulating portion for the PCM signal have to be provided for each of the two channels.

As shown in FIG. 3, the editing controller 4 includes two RAMs (random access memories) 16, 17 and a control circuit or micro-processor 18. In connection with the control circuit 18, two time code generator and reader circuits 19 and 20 provide the absolute addresses corresponding to the time codes supplied through time code input terminals TCI41 and TCI42 of controller 4, and to then produce predetermined control signals and also provide new time codes at time code output terminals TCO41 and TCO42 of controller 4. Control circuit 18 produces command signals to control the operations of VTRs 1 and 2, and such command signals are supplied from the remote control terminals of controller 4 to the remote control terminals of VTRs 1 and 2, respectively. The write-in and read-out of RAMs 16 and 17 are control by the controlled circuit 18, respectively. The editing controller 4 further includes a data input terminal DI4, which is connected to a data output terminal DO32 and PCM adapter 3, a data output terminal DO42 which is connected to data input terminal DI32 of PCM adapter 3, and a data output terminal DO41 which is connected to data input terminal DI31 of PCM adapter 3. The PCM data delivered to the data output terminals DO41 and DO42 are respectively selected by data selectors 21 and 22. The editing controller 4 also includes video input terminals VI41, VI42 and VI40 to which the reproduced PCM signals from the VTRs 1, 2 and a PCM signal from a video output terminal VO31 of PCM adapter 3 are supplied, respectively. The PCM signal from one of the video input terminals VI40, VI41 and VI42 is selected by a video selector 23 and then fed through a video output terminal VO40 of controller 4 to a video input terminal VI3 of PCM adapter 3.

The PCM data from the data output terminal DO42 is adapted to be supplied through the data input terminal DI32 and switch 14 to the D/A converter 15 of PCM adapter 3 and then reproduced from the monitor speaker 5, while the PCM signal appearing at the data output terminal DO41 is adapted to be supplied through the data input terminal DI31 and switch 9, to the encoder 10 and thence through video output terminal VO32 of PCM adapter 3 to the VTR 2 for recording therein. Owing to the interleave process, a delay time is generated in the encoder 10, so that the monitored signal will not be consistent with the signal being recorded. A delay is also generated by reason of the time required for the PCM data from the editing controller 4 to be recorded in the VTR 2. To correct the above, it is necessary that the PCM data fed to the D/A converter 15 be delayed in respect to the PCM data fed to the encoder 10 and that the PCM data from editing controller 4 be advanced. In the editing controller 4, a delay time detecting circuit 24 is provided to detect the inherent delay time of PCM adapter 3 and to supply the detected result to the control circuit 18. Next, a sequence of the operations for editing will be explained with reference to FIG. 3.

Prerecording of First Program

First, the PCM signal of the first program (#1) is reproduced from the master tape 6 in the VTR 1 and is recorded on the editing tape 7 in the VTR 2. The reproduced PCM signal is not only supplied to the VTR 2 for recording, but is also supplied to the speaker 5 to be monitored.

During the prerecording of the first program on tape 7, the reproduced PCM signal from the video output terminal VO1 of the VTR 1 is also supplied through the video input terminal VI41 of the editing controller 4 to a first terminal 23-1 of the video selector 23. Since the movable arm of the video selector 23 is connected with the first terminal 23-1 during the operation being here described, the PCM signal is supplied through the video output terminal VO40 of the controller 4 to the video input terminal VI3 of the PCM adapter 3. The PCM signal from the terminal VI3 is fed through the processor or separator 12 to the decoder 13, in which the time base error is removed from the reproduced PCM signal and any required error correction is performed by using an error correcting code. The corrected PCM signal is supplied to the data output terminal DO32 which is connected with the data input terminal DI4 of the editing controller 4. The PCM signal from the terminal DI4 is supplied to one fixed terminal 21-1 of the data selector 21 which has its movable arm connected to the terminal 21-1 during prerecording of the first program. The PCM signal is further supplied through the data output terminal DO41 to the data input terminal DI31, from which the PCM signal is fed to the editing switch 9 which is connected to its terminal 9-1. Finally, the PCM signal from the switch 9 is supplied through the encoder 10, the video amplifier 11 and the video output terminal VD32 to the video input terminal VI2 of the recorder VTR 2. Thus, the PCM signal reproduced from the master tape 6 in the player VTR 1 is recorded on the editing tape 7 in the recorder VTR 2.

The corrected PCM signal from the terminal DI4 of the controller 4 is also supplied to a first fixed terminal 22-1 of the data selector 22. Since the movable arm of the selector 22 is connected to first fixed terminal 22-1 during prerecording of the first program, the PCM signal is supplied through the data output terminal DO42 to the data input terminal DI32 of the PCM adapter 3 and further to the terminal 14-1 of the monitor switch 14. Since the movable arm of the switch 14 is connected to the terminal 14-1 thereof, the PCM signal is supplied to the D/A converter 15 and converted therein to a corresponding analog signal which is supplied from the audio output terminal AO3 to the monitor speaker 5 for monitoring of the PCM signal being recorded on the editing tape 7.

It is herein noted that the first program #1 is recorded on the editing tape 7 somewhat longer than the desired duration for the cross-fade operation, as hereinafter described in detail.

DETERMINATION OF EDIT POINTS

After the PCM signal of the first program #1 is recorded on the editing tape 7 in the VTR 2, the fade-out edit point FO and the fade-in edit point FI are determined on the editing tape 7 and the master tape 6, respectively. The fade-out edit point FO is determined first as follows:

The first program #1 is reproduced from the editing tape 7 while searching for a desired edit point. The reproduced PCM signal from tape 7 is transferred by way of the terminal VO2 of the VTR 2, the terminal VI42 of the controller 4, the video selector 23, the terminal VO40, the terminal VI3 of the PCM adapter 3, the decoder 13, the terminal DO32 the data selector 22, the terminal DO42, the terminal DI32 of the adapter 3, the converter 15 the terminal AO3 to the monitor speaker 5 to be audited as the reproduced sound. Further the reproduced PCM signal from the terminal DI4 of the controller 4 is supplied to the RAM 16 to be stored therein.

After, for example, three seconds have elapsed from the time when a predetermined switch actuating key is pushed down at the vicinity of the desired fade-out point FO, the recorder VTR 2 enters its pause state, the PCM data within ±3 seconds before and after the time that the key is pushed down are written in RAM 16, and then the RAM 16 is changed to the read-out state.

In response to the rotation of a search dial 36 (FIG. 4), the stored PCM data are more or less slowly read out from RAM 16 and fed through data selector 22 to the monitor path. During such read-out, the fade-out edit point FO is determined by listening to the reproduced sound and, upon the occurrence of a desired sound, pushing a predetermined switch by which the address of the selected fade-out edit point FO is stored in a register 40 (FIG. 4) as an absolute address which includes, in addition to the time code address comprised of hours, minutes, seconds, and frames, a word address representing a particular word number in a frame (which, for example, is comprised of 1470 words).

The fade-in edit point FI is determined in a manner generally similar to that described above for determining the fade-out edit point FO. More particularly, the master tape 6 is reproduced by player VTR 1 and the reproduced PCM data are written in RAM 16 through the signal path of terminal VO1, terminal VI41, video selector 23 → terminal VO40, terminal VI3, decoder 13, terminal DO32, terminal DI4, RAM 16. By operating a predetermined key actuated switch, the PCM data near the fade-in edit point FI are written in RAM 16 and the player VTR 1 enters its pause state. Then, the search dial 36 is rotated and the reproduced sound of the PCM data read out more or less slowly from RAM 16 is monitored to precisely determine the desired fade-in edit point FI. The absolute address (including the time code address and the word address) corresponding to the fade-in edit point FI is stored in the register 40.

While the search dial 36 is rotated to determine the fade-in edit point FI on tape 6, the PCM data near the fade-out edit point FO on tape 7 are written in RAM 17. More particularly, the editing tape 7 is rewound a predetermined amount VTR2 and then the latter is changed over to its reproducing state. A predetermined amount of the PCM data recorded on tape 7 near the fade-out edit point, for example, in the interval from 10 frames before the fade-out edit point FO to 6 frames after the point FO are written in RAM 17 through the path of terminal VI42, video selector 23, terminal VO40, terminal V13, decoder 13, terminal DO32, terminal DI4, RAM 17.

Figure 4:
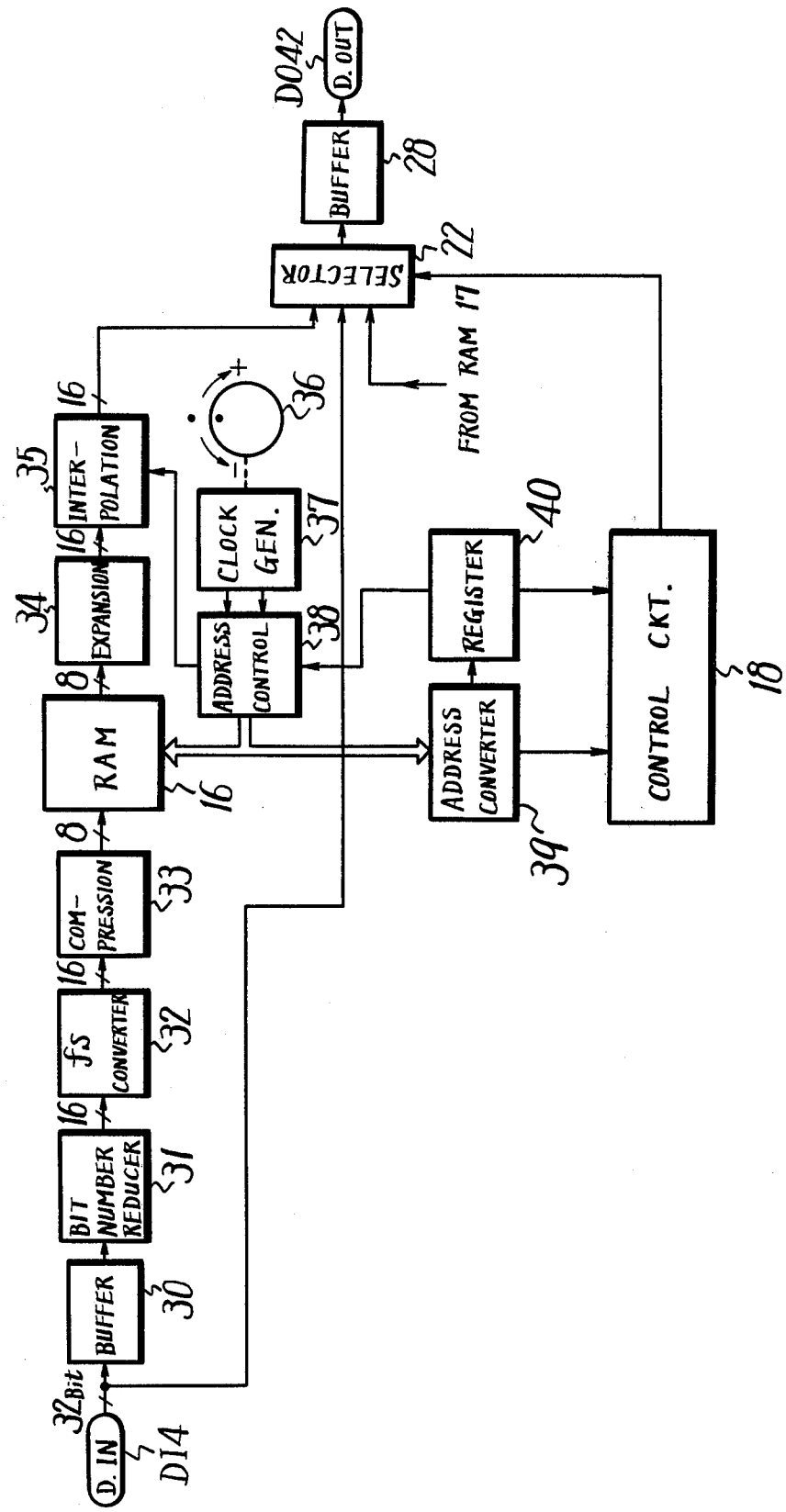
FIG. 4 is a block diagram of a memory circuit which may be used in the embodiment of FIG. 3.

As shown, particularly in FIG. 4, the PCM data from the data input terminal DI4 consists of 32 bit-words in each of which the left and right channels are represented by 16 respective bits, and such data are supplied to a buffer amplifier 30 in the form of parallel bits. A bit number reducing circuit 31, which receives the PCM data from the buffer amplifier 30, reduces the number of the PCM data from the amplifier 30 to 16 bits by selecting either the left or the right channel or by mixing both channels. A sample frequency ($f_s$) converting circuit 32 receives the output from the bit number reducing circuit 31, and reduces the sample frequency $f_s$ of the PCM data (for example, 44.056 kHz) by ½. A folded line compressing circuit 33 receives the output from converting circuit 32, and non-linearly level-compresses each word of 16 bits so as to convert the same into 8 bits. By this process, the necessary capacity of RAM 16 can be reduced at the expense of the quality of the reproduced sound that results from demodulating the PCM data read out from RAM 16 becoming poor. In this case, however, the PCM data from RAM 16 is only used for monitoring when determining the edit point, so that the PCM data from RAM 16 does not need to be of especially high quality.

The PCM data, in the form of 8-bit words read out from RAM 16, is supplied to a folded line expanding circuit 34 which converts the same into 16 bit words and supplies the same to an interpolation circuit 35. When the fade-out edit point FO is being determined as earlier described, the turning ON of a key actuated switch causes the PCM data within ±3 seconds before and after the switch being turned ON to be written in the RAM 16 and thereafter the VTR 2 enters it pause state. When the VTR 2 enters the pause state, RAM 16 is changed over from the write-in state to the read-out state. A clock pulse determined by the rotating speed and direction of search dial 36 is generated from a clock generator 37. The generation of such clock pulse may be carried out by a photo-electric device. The clock pulse from the clock generator 37 is applied to an address counter of an address control circuit 38 which then produces the address signal and supplies it to the RAM 16 and to an address converting circuit 39 which is supplied with the time code from the VTR 1 or 2 selected by the control circuit 18. When the key-actuated or edit switch is turned ON as set forth above, the address at that time is memorized in the register 40 and the address from the register 40 is loaded into the address counter of control circuit 38. Accordingly, when the edit switch is turned ON, the PCM data occurring before and after the switch is turned ON are written in RAM 16.

When the search dial 36 is rotated in the clockwise direction, the clock generator 37 produces a clock pulse which will make the address counter of control 38 increment or count in the adding direction, whereas when the search dial 36 is rotated in the counter clockwise direction, the generator 37 produces a clock pulse which will make the address counter decrement or count in the subtracting direction. By rotating the search dial 36 one or several turns, all the PCM data memorized in the RAM 16 can be read out. Thus, with a feeling similar to that of a tape reel of an analog tape recorder being rotated manually, a reproduced sound can be audited through monitor speaker 5 in response to the rotation of search dial 36. When the fade-out edit point FO is determined, the absolute address corresponding to the fade-out edit point FO is memorized in the register 40. The absolute address is then fed to the control circuit 18 to be used to control the editing operation. The same procedure occurs in the case when the reproduced PCM data from the master tape 6 is memorized in RAM 16 to determine the fade-in edit point FI.

Even if the PCM data read out from RAM 16 in response to the rotation of search dial 36 is D/A converted, they can not be heard without further processing. Therefore, the interpolation circuit 35 is provided. When two contiguous words of the PCM data are generated with a time interval corresponding to the rotating speed of search dial 36, the interpolation circuit 35 divides that time interval by a predetermined number to provide a corresponding number of PCM data constituting interpolation data and having respective levels which vary gradually from the level of the preceding word to that of the following word, and then extracts the PCM data with the sample period 1/fs from the interpolation data.

Figure 5:
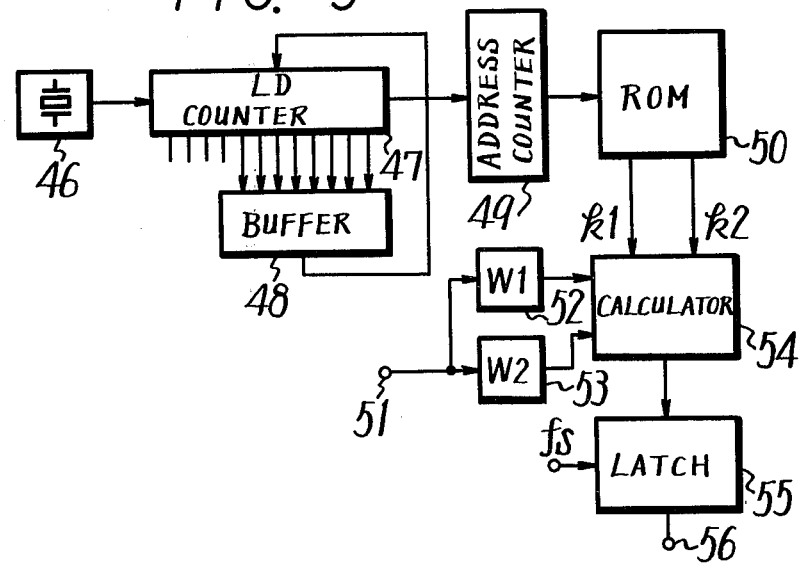
FIG. 5 is a block diagram of an interpolation circuit which may be used in the embodiment of FIG. 4.

FIG. 5 shows an example of interpolation circuit 35. In this example, the output from a reference oscillator 46 is supplied to a counter 47 providing a carry output which is fed to an address counter 49 whose output is in turn fed to a ROM (read only memory) 50. Thus, from the ROM 50 read out there are obtained interpolation coefficients k1 and k2. At every time when a carry output is produced from the counter 47, the eight higher bits thereof are loaded from the counter 47 into a buffer 48. The PCM data from the folded line expanding circuit 34 is fed through an input terminal 51 to latch circuits 52 and 53. If a certain word W1 of the PCM data is latched by the latch circuit 52, the following word W2 of the PCM signal is latched by the latch circuit 53. These words W1 and W2 of PCM data and coefficients k1 and k2 from ROM 50 are fed to a calculating circuit 54. The interpolation data from the calculating circuit 54 are fed to a latch circuit 55 which is supplied with the latch pulse of the normal sample frequency $f_s$. Thus, at an output terminal 56 led out from latch circuit 55, there are obtained the PCM data which has been subjected to the interpolation process.

Figure 6:
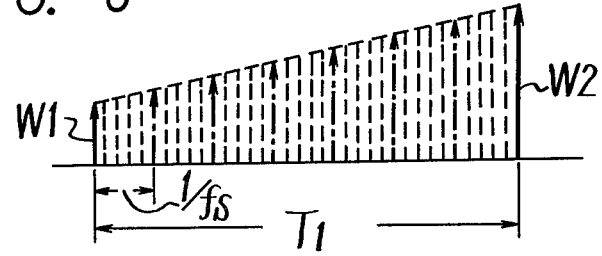
FIG. 6 is a chart which is used for explanation of the operation of the interpolation circuit of FIG. 5.

The time interval T1 between the time when one word W1 is read out from RAM 16 and the time when the following word W2 is read out from RAM 16 depends upon the rotating speed of search dial 36 and hence is not a constant value as shown in FIG. 6. Therefore, the PCM data W1 and W2 are held in the latch circuits 52 and 53, respectively, and the time interval T1 is measured by the counter 47. Then, the measured time interval is divided into a predetermined number, for example, 256. This is effected in such a manner that the eight higher bits, including the most significant bit, of counter 47 are stored in the buffer 48 and then loaded into the counter 47 each time when the carry output is generated by counter 47. Therefore, the counter 47 produces the carry outputs with the interval of T1/256, and at every carry output the ROM 50 produces the predetermined coefficients k1 and k2. In the calculating circuit 54, the calculation of (k1W1+k2W2) is carried out and the interpolation data produced therefrom will linearly approximate the interval between the levels of the PCM data W1 and W2 as shown in FIG. 6 by the broken lines. During the time interval T1, the coeffient k1 is sequentially changed as follows 255/256, 254/256, ... 1/256, and the coefficient k2 is sequentially changed as follows 1/256, 2/256, ... 255/256. In the latch circuit 55, the data at every sampling period $1/f_s$ are extracted, as shown by one-dot chain lines in FIG. 6, and delivered to the output terminal 56.

DETECTION OF DELAY TIME

The PCM signals reproduced from the VTRs 1 and 2 are processed in PCM adapter 3, in which the PCM signals are delayed for a predetermined time owing to interleaving processing of the PCM signals in the encoder 10 and the decoder 13. As a result of such delay, the PCM data from the controller 4 has some delay at the input VI2 of the recorder VTR 2. In order to compensate for such delay time in the PCM adapter 3, it is necessary as a first step, to detect the inherent delay time in the PCM adapter 3. In the embodiment according to this invention, such delay time is detected by a delay detector 24 in the editing controller 4.

The detection of the inherent delay time is performed in response to a control signal from the micro-processer or control circuit 18 while determining the fade-out edit point FO. More particularly, in response to the control signal, the delay detector 24 issues a word of a given pattern and the word passes through the path of terminal DI31, encoder 10, terminal VO31, terminal VI40, video selector 23, terminal VO40, terminal VI3, decoder 13, terminal DO32, terminal DI4, detector circuit 24, by which the delay time is detected.

Figure 7:
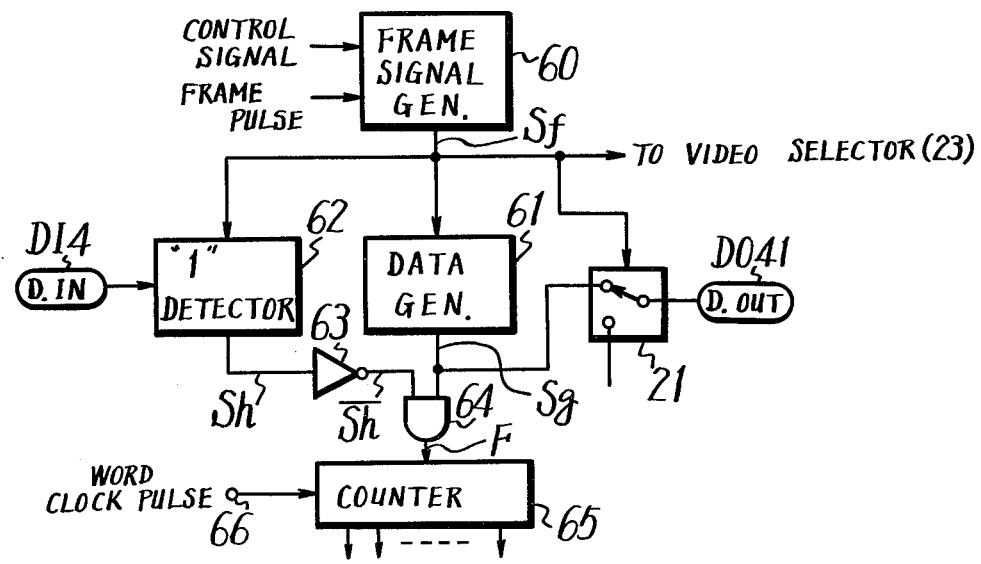
FIG. 7 is a block diagram of a delay detection circuit which may be used in the embodiment of FIG. 3.

FIG. 7 shows a practical example of the delay time detecting circuit 24 which includes a frame signal generator 60 supplied with the control signal shown in FIG. 8A from the control circuit or micro-processor 18 and also supplied with the frame pulse of FIG. 8B when in the delay time detecting mode. In response to the control signal (FIG. 8A), the frame signal generator 60 produces a frame signal Sf which is "1" for the period of 3 frames after the generation of the control signal (FIG. 8A), as shown in FIG. 8C. The video selector 23 is controlled by the frame signal Sf and is switched over when signal $S_f$ is "1" to engage its terminal 23-3 so that the PCM signal appearing at terminal VO31 of PCM adapter 3 is supplied to terminal VI3 of PCM adapter 3. The frame signal Sf is also fed to a data generator 61, so that this generator 61 produces a detecting digital signal Sg which is "0" during the first of the three frames when frame signal Sf is "1", and "1" in the two remaining frames, as shown in FIG. 8D. This digital signal Sg is fed to an AND gate 64 and also through data selector 21 to data output terminal DO41. The data selector 21 is positioned by frame signal $S_f$ to select the detecting digital signal Sg during the time that frame signal Sf is "1". One word of the PCM data is provided, for example, of 32 bits, and the least significant bit thereof is made to correspond to the detecting digital signal Sg. More particularly, the digital signal appearing at data output terminal DO32 of PCM adapter 3 is supplied to the data input terminal DI4 and then to a "1" detecting circuit 62. The detecting operation of "1" detecting circuit 62 is made effective only when the frame signal Sf is "1". The detected output Sh from the "1" detecting circuit 62 (shown in FIG. 8E) is inverted by an inverter 63, and the resulting inverted original Sh is supplied to the AND gate 64. During the time when the output of AND gate 64 is "1", a counter 65 counts word clock pulses from a terminal 66.

The detecting digital signal Sg shown in FIG. 8D is fed to "1" detecting circuit 62 through the path of terminal DO41, terminal DI31, encoder 10 terminal VO31, terminal VI40, video selector 23, terminal VO40, terminal VI3, decoder 13, terminal DO32, terminal DI4, so that the detected output Sh from the "1" detecting circuit 62 is delayed relative to signal Sg by delay time T which is generated in the above signal transmission path as shown in FIG. 8E. Accordingly, the output F from AND gate 64 becomes "1" in this delay time T as shown in FIG. 8F and hence the counter 65 counts N word clock pulses in this time period T. The counted value N of counter 65 corresponds to the delay time T and is used to correct the address at the edit point and also to delay the PCM data for monitoring as described above.

As the detecting digital signal Sg, a signal may be used in which a certain word is "1" and the remaining words are all "0".

EDITING OPERATION

After finishing the preliminary stages of the editing operation described before, the actual editing operation is performed in accordance with the following sequence. First of all, a rehearsal is generally carried out to ascertain whether or not the intended editing operation will be achieved. The only difference between the editing operation and the rehearsal resides in the fact that the VTR 2 is changed over from the reproducing state to the recording state in the editing mode, while it remains in the reproducing state in the rehearsal mode. At first, the reproduced signal from the VTR 2 is supplied to the monitor speaker 5 through the path of input terminal VI42, video selector 23, output terminal VO40, input terminal VI3, decoder 13, output terminal DO32, input terminal DI4, RAM 17, data selector 22, output terminal DO42, input terminal DI32, D/A converter 15. When the editing tape 7 is being reproduced at the point which is 10 frames from the edit point, the PCM signal stored in the RAM 17 is read out and subjected to the delay process therein. Then, the PCM signal is fed through the above path from data selector 22 to the monitor speaker 5. Meanwhile, the reproduced signal from the VTR 1, which is driven in rotary phase with the VTR 2, is fed from the input terminal VI41 to the video selector 23 and then to the RAM 17 through the above defined path. At the editing point, the reproduced signal from VTR 1 and the PCM signal stored in RAM 17 are cross-faded. Thereafter, the reproduced signal from the VTR 1, which has been delay-processed in RAM 17, is fed to the monitor speaker 5. After the editing point has been thus ascertained, in the rehersal mode the normal or true editing operation is started. The above generally described operations are effected as follows:

(1) Synchronizing drive between the VTR 1 and VTR 2:

At first, when an auto edit button on a key board is depressed to turn ON a respective switch, both VTRs 1 and 2 are changed-over to their rewinding operation. When the tapes thereof are rewound by a predetermined amount, the VTRs 1 and 2 are switched to their pause state, respectively. Then, they start their reproducing operation simultaneously. In this case, the control of the rewinding amount is effected with the reproduced time code being monitored and with the absolute addresses of the fade-out and fade-in edit points FO and FI as the reference. If the absolute address corresponding to the fade-out edit point FO is identified as G (g1 hour, g2 minute, g3 second, i frame, α word) and that corresponding to the fade-in edit point FI is identified as L (l1 hour, l2 minute, l3 second, j frame β word), the VTR 1 is rewound from an address corresponding to the address L without the word number β to an address therebefore, for example, 299 frames before such address L, while the VTR 2 is rewound from an address corresponding to the address G without the word number α to an address therebefore by 300 frames. Since the VTRs 1 and 2 start their reproducing operations simultaneously, the PCM data #2 (FIG. 9B) reproduced from the master tape 6 in player VTR 1 is ahead of the PCM data #1 (FIG. 9A) reproduced from the editing tape 7 in recorder VTR 2 by one frame in phase. The above so-called rotary phase drive, in which two VTRs are made to reproduce in frame synchronization by utilizing the time code, is generally employed in the editing of video signals, so that its detailed description will be omitted herein. In this case, the program #1 being recorded by the VTR 2 on its editing tape 7 can be monitored by the speaker 5 through the monitor path of terminal VI42, video selector 23, terminal VO40, terminal VI3, decoder 13, terminal DO32, terminal DI4.

(2) Calculation of the Delay Word:

In the case of audio signals, joining two programs on the basis of the frame as a unit becomes unnatural at the location of the joint so that it is necessary to effect the joining with the word as a unit. To this end, the micro-processor 18 carries out a predetermined calculation by using the absolute addresses of the fade-in and fade-out edit points FI and FO and those being reproduced currently from the master tape 6 and editing tape 7 to obtain the number of words that are the difference between the fade-in and fade-out edit points FI and FO. The PCM data from the editing tape 7 is delayed relative to the PCM data from the master tape 6 by the amount corresponding to the number of difference words obtained by the above calculation and then the joint or editing can be carried out with high accuracy.

In order to perform the above editing, it is necessary to measure the above difference words (which will be hereinafter referred to as delay word). The delay word can be calculated from the time codes when the VTRs 1 and 2 are driven in rotary phase relation as follows:

FIGS. 10A and 10B show a relationship between the master tape 6 and the editing tape 7 in the vicinity of the edit points FO and FI. The calculation of the extent to which frames of data on tapes 6 and 7 are out of phase is carried out in the micro-processor 18 from the time codes read out from the VTRs 1 and 2 which are supplied with the PCM data #1 and #2. If it is assumed that the time code being reproduced from the VTR 2 is M and that from the VTR 1 is N, the micro-processor 18 achieves a calculation of $|M-N|-|G-L|-\leqq 0$. If frame synchronization is established, the above expression for the calculation becomes $|\beta-\alpha|-1470$ (words) $\leqq 0$ because one frame is 1470 words. In other words, as may be clear from FIG. 10, during the period when the VTRs 1 and 2 are in the reproducing state, the delay word number n $(=|\beta-\alpha|)$ of the difference words between the fade-out and fade-in edit points FO and FI can be calculated. Accordingly, if the PCM data #2 is delayed by the sum of the delay word number n and 1 frame, the phase matching can be performed per word unit (sample period). This delay is caused in the RAM 17 as will be described later.

In fact, even if the VTRs 1 and 2 are both rewound by the same predetermined amount and then driven simultaneously to start their reproducing operation, a deviation in frame synchronization may be caused due to mechanical delay and so on. In the case where the PCM data #2 are delayed by the RAM 17, this deviation may be also removed. In this case, the rewinding amount is selected to provide a difference between frames of more than 1 frame, for example, (G−300 frames), (L−297 frames) a difference of 3 frames.

(3) Change from VTR 2 output to RAM output:

When the point 10 frames before the fade-out edit point FO is reached, as shown in FIG. 9C, the PCM data #1 (indicated by the broken line crosshatching) and which are already stored in the RAM 17, are read out therefrom and, at the same time, the VTR 2 is changed from the reproducing state to the recording state. Therefore, the PCM data read out from the RAM 17 are recorded again in the VTR 2.

In this case, the PCM data read out from the RAM 17 must satisfy the following two conditions.

(i) Since the reproduced PCM data from the VTR 2 pass through the decoder 13, the PCM signal delayed by the predetermined amount is monitored through the speaker 5. Accordingly, the PCM data, which is read out from the RAM 17 and then fed to the monitor speaker 5, must be in synchronism with the delayed PCM signal from the VTR 2.

(ii) Since the PCM data read out from the RAM 17 is recorded in the VTR 2 again, the PCM data to be supplied to the VTR 2 must be synchronized with the reproduced PCM signal from the VTR 2 which is not delayed.

The method for controlling the RAM 17 in order to satisfy the above conditions, (i) and (ii) will be described with reference to FIGS. 11A-11E.

FIG. 11C shows the content of the PCM data stored in the RAM 17. In accordance with the above explanation, at least the contents from the point 10 frames before the edit point to the point 6 frames after the edit point are stored in the RAM 17. However, precisely speaking, a somewhat greater content is stored in the RAM 17. More particularly, as shown in FIG. 11A, the point 10 frames before the edit point is detected from the time code read out from the VTR 2. When the write enable signal is fed to the RAM 17, the PCM signal supplied to the RAM 17 is a PCM signal which is delayed by delay amount $D_D$ in decoder 13 relative to the signal at the 10th frame before the edit point. At this time, the signal appearing at the data output terminal DO32 of PCM adapter 3 is as shown in FIG. 11B. Accordingly, as shown in FIG. 11C, the reproduced signal is stored in the RAM 17 starting from the point which is the delay amount $D_D$ before the point 10 frames before the edit point.

The control for the RAM 17 to satisfy the above second condition (ii) will now be described. Since the PCM signal supplied to the video input terminal VI2 of VTR 2 must be in synchronism with the reproduced PCM signal from the VTR 2, the data signal supplied to the terminal DO41 is read out from RAM 17 ahead of the time corresponding to the detected delay amount $W_D$ in the delay detecting circuit 24. Accordingly, the PCM signal appearing at the data input terminal DI31 of PCM adapter 3 is as shown in FIG. 11D. The PCM signal is delayed in the encoder 10 by the delay amount $D_E$, so that the PCM signal supplied to the video input terminal VI2 of VTR 2 is in synchronism with the reproduced PCM signal.

In order to satisfy the above noted first condition (i), the data signal earlier read out from RAM 17 by the delay amount $W_D$ is stored in the same RAM again. Then, it is read out with the delay time of $W_D$ as shown in FIG. 11E. This means that the read-out data signal from the RAM 17 is returned to the original timing. Accordingly, even if, as shown in FIGS. 11A and 11E, at the time 10 frames before the edit point, the reproduced PCM signal from the data input terminal DI4 is changed to the data signal read out from the RAM 17, a continuous reproduced signal is obtained.

Thus, during the time period from the time 10 frames before the edit point to the edit point, the data signal read out from the RAM 17 is recorded in the VTR 2 and also supplied to the monitor speaker 5 to be continuously monitored.

(4) Cross-Fade Operation:

When the data signal read out from the RAM 17 arrives at the fade-out edit point FO, the cross-fade operation between that data signal and the reproduced PCM signal from the VTR 1 is carried out. The PCM signal reproduced from the VTR 1 is supplied through the PCM adapter 3 to the RAM 17. As set forth above, since the delay word between the fade-in and fade-out edit points FI and FO is calculated with the VTRs 1 and 2 being driven in rotary phase relation, the PCM signal reproduced from the VTR 1 and stored in the RAM 17 is read out with a delay equal to this delay word. Accordingly, when the data signal read out from the RAM 17 reaches the fade-out edit point FO, the PCM signal reproduced from the VTR 1 and delayed in RAM 17 arrives at the fade-in edit point FI. Therefore, the data signal and reproduced signal simultaneously read out from RAM 17 are both fed to a cross-fader (not shown). In this cross-fader, there is effecting mixing of the PCM data #1 whose level is gradually reduced from the fade-out edit point FO and of the PCM data #2 whose level increases gradually from the fade-in edit point FI. The mixed PCM data thus produced are recorded on the editing tape 7 in the VTR 2.

In this case, it should be noted that since the PCM signal reproduced from the VTR 1 is in synchronism with that reproduced from the VTR 2 but is not synchronized with the data signal earlier read out from the RAM 17 by the delay amount $W_D$ shown in FIG. 11D, the reproduced signal from the VTR 1, which is stored in the RAM 17, must also be read out earlier by the delay amount $W_D$.

After the cross-fade process is completed as above the reproduced PCM signal from the VTR 1 is directly fed to the VTR 2 through the path of PCM adapter 3, editing controller 4, PCM adapter 3 and hence the PCM data #2 are recorded on the editing tape 7.

As will be described later in detail, the RAM 17 is desirably divided into three blocks. The first block of RAM 17 is used to record the signals from the point 10 frames before the edit point to the point 6 frames after the edit point, the second block is used to delay the reproduced PCM signal from the VTR 1 by the delay word between the edit points, and the third block is used to correct the word delay amount $W_D$ in the PCM adapter 3. In the foregoing case, the respective blocks of RAM 17 may be controlled in non-synchronism in response to the address signal.

Next, a specific example of the construction of the memory circuit including the RAM 17 will be described with reference to FIG. 12. As noted above, the RAM 17 consists of three blocks 17a, 17b and 17c. The memory block 17a is to memorize the PCM data from the point 10 frames before the fade-out edit point FO to the point 6 frames after the same, the memory block 17b is to delay the PCM data reproduced from the player VTR 1 by the delay word between the edit points and to establish the synchronization, and the memory block 17c is to delay the PCM data, which are fed through the data selector 21 to the encoder 10 of PCM adapter 3, by the delay amount $W_D$ which may be, for example, 2/7 frames.

As set forth above, when the fade-in edit point FI is determined, the PCM data in the vicinity of the fade-out edit point FO are written in the memory block 17a of RAM 17. To this end, an address counter 71 is employed. During the interval when the PCM data from the point about 10 frames before the fade-out edit point FO to the point 6 frames thereafter are supplied to the data input terminal DI4, the PCM data are written in the memory block 17a of RAM 17 in accordance with the address from the address counter 71 which is selected by an address selector 75. Then, specific command signals are supplied from the micro-processor 18 to a RAM control circuit 76, from which the respective control signals are fed to address selector 75, RAM 17 and an input and output control circuit 77 so as to enable the writing of the PCM data into the block 17a of RAM 17.

Figure 12:
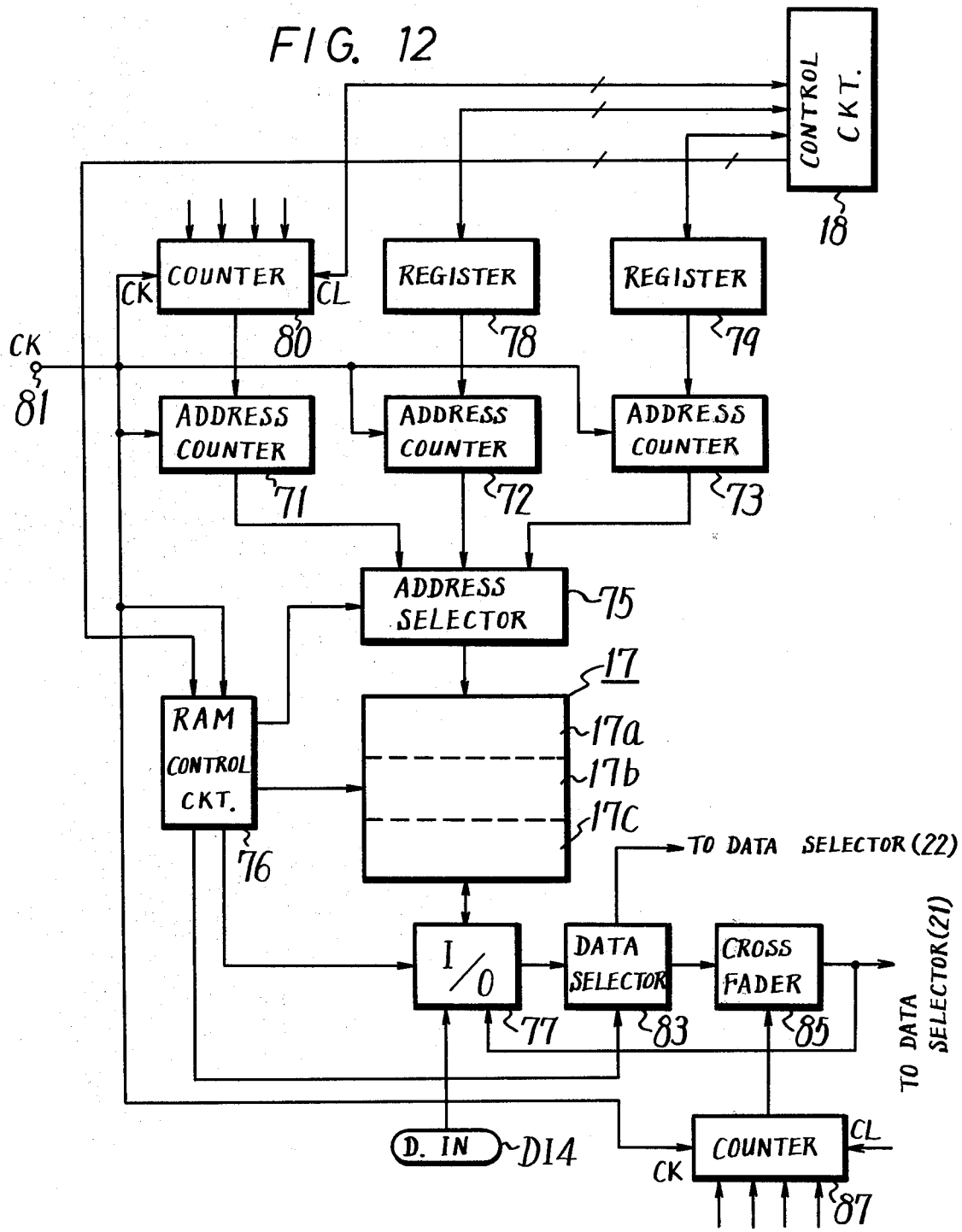
FIG. 12 is a block diagram of a memory circuit which may be used in the embodiment of FIG. 3.

The memory circuit shown in FIG. 12 is provided with registers 78 and 79 which memorize the edit word delay and the coding word delay $W_D$, respectively. Both of the word delays are supplied to the respective registers 78 and 79 from the micro-processor 18 as a result of calculation of time codes from the VTRs 1 and 2. During synchroneous driving of the VTRs 1 and 2, the PCM data reproduced from the VTR 1 are written into the memory block 17b of the RAM 17 and sequentially read therefrom with a suitable time delay (edit word delay—coding word delay).

As described above, the PCM data stored in the block 17a of RAM 17 are read out from the time T1 10 frames before the fade-out edit point FO, as shown in FIg. 11D. A counter 80 is provided for detection of such time T1. The counter 80 has load terminals, to which a number $(1470-W_D)$ is loaded at the timeing when a load signal is supplied to a clear terminal CL of the counter 80. The load signal is generated by the micro-processor 18 at the time T2 11 frames before the edit point FO, as shown in FIG. 11A. As a result, from the beginning of the 11th frame before the edit point the counter 80 starts to count clock signal CK having the word frequency and which is supplied from a clock terminal 81, and the counter 80 generates a carry signal when the counter 80 counts to the number $(1470-W_D)$. It is here noted that the time when the carry signal is generated corresponds to the time which is 10 frames and coding word delay $W_D$ before the edit point FO. The carry signal from the counter 80 is supplied to the address counter 71, so that the counter 71 generates address signals which are sequentially renewed at every clock signal CK supplied thereto. The address signals are supplied through the address selector 75 to the RAM 17, and thereby the PCM data stored in the block 17a of the RAM 17 are sequentially read out in response to the address signals from the time T1 shown in FIG. 11D.

First, the read-out PCM data are directly supplied through an I/O circuit 77, a data selector 83 and a cross-fader 85 to the data selector 21. In this case, the cross-fader 85 is so set that the PCM data are fed as they are to the data selector 21. The PCM data from the data selector 21 are fed through the encoder 10 of PCM adapter 3 to the VTR 2 and recorded on its editing tape 7.

The read-out PCM data are again written in the block 17c of the RAM 17 in response to the address signal from the address counter 73. The address counter 73 is controlled so as to generate a write address signal and a read address signal which is delayed with respect to the write address signal by coding word delay $W_D$ memorized in the register 79. The PCM data read out in response to the read address signal are delayed by coding word delay $W_D$. The delayed PCM data are supplied through the I/O circuit 77 and the data selector 83 to the data selector 22, from which the PCM data are fed to the monitor speaker 5 for monitoring, as described above.

At the same time, the reproduced PCM signal from the VTR 1 is fed to the data input terminal DI4 and then to the memory block 17b of RAM 17 through the I/O circuit 77 to be sequentially written in the memory block 17b in response to the address signal from the address counter 72. The address counter 72 produces, at the read-out time, the address signal which is delayed by the word delay between the fade-out and fade-in points FO and FI. Then, the reproduced PCM signal delayed by the word delay is read out from the block 17b of RAM 17 in response to the address signal. This means that the reproduced PCM signal from the block 17b is in synchronism with the PCM data read out from the block 17a of RAM 17.

It should be here noted that the read-out of the PCM data from the block 17a of the RAM 17, the rewrite-in and read-out of the PCM data to the block 17c thereof and the write-in and read-out of the reproduced PCM signal to the block 17b thereof are performed within one word cycle of the PCM data. Therefore, the one word cycle is divided into six sub-cycles as follows: a first sub-cycle for reading the PCM data stored in the block 17a, a second sub-cycle for reading the reproduced PCM signal stored in the block 17b, a third sub-cycle for writing the reproduced PCM signal in the block 17b, a fourth sub-cycle for writing the PCM data in the block 17a, a fifth sub-cycle for reading the PCM data stored in a block 17c, and the sixth sub-cycle for writing the PCM data in the block 17c. The address selector 75, the I/O circuit 77 and the data selector 83 are controlled by the RAM control circuit 76 so that the corresponding address signal and PCM data are supplied to the RAM 17 in accordance with each of the sub-cycles.

Thus, when the PCM signal of the frame including the fade-in edit point FI is reproduced from the VTR 1, a command signal produced by the micro-processor 18 is supplied to counter 87. Further, the word address of the fade-in edit point FI is supplied at the load terminals of the counter 87, so that, when the command signal is supplied to the clear terminal of the counter 87, the word address is loaded in the counter 87 and the counter 87 starts to count the clock signal from the terminal 81. When the counter 87 counts to the number of the word address, a carry signal is generated therefrom. The carry signal is supplied to the cross-fader 85 as a cross-fade start signal, and thereby the cross-fader 85 produces the mixed PCM data from the PCM data #1, whose level decreases gradually within the set cross-fade time, and the PCM data #2, whose level increases gradually within the set cross-fade time. These mixed PCM data are recorded on the editing tape 7.

Further, the cross-faded signal from the cross-fader 85 is again fed back to the I/O circuit 77 and then written in the block 17c of the RAM 17 in the same manner as described before. The cross-faded signal is delayed by the coding word delay $W_D$ and thereafter is supplied by way of the I/O circuit 77 and the data selector 83 to the monitor speaker 5.

After the cross-fade time has elapsed, the cross-fader 85 produces only the PCM data #2 which is then recorded on tape 7 for as long as desired while the reproduced sound is monitored to complete the recording operation.

Although illustrative embodiments of the invention have been described in detail herein with reference to the accompanying drawings, it is to be understood that the invention is not limited to those precise embodiments, and that a person skilled in the art could effect many changes and modifications therein without deporting from the scope or spirit of this invention as defined in the appended claims.

We claim as our invention:

1. Method of editing digital signals which are composed of successive frames with a plurality of words included in each frame, said method comprising the steps of:
   reproducing first digital signals from a first recording medium;
   reproducing second digital signals from a second recording medium;
   determining editing points for said first and second digital signals, respectively;
   storing either one of said first and second digital signals for a predetermined duration which includes the respective one of said editing points;
   recording the stored digital signals at least in the neighborhood of said respective editing point on said first recording medium; and
   recording on said first recording medium, subsequent to said stored digital signals, said second digital signals with the recorded stored digital signals forming a discontinuity-free transition between said second digital signals and said first digital signals as recorded on said first recording medium.

2. Method of editing digital signals which are composed of successive frames with a plurality of words included in each frame, said method comprising the steps of:
   reproducing first digital signals from a first recording medium;
   reproducing second digital signals from a second recording medium;
   determining editing points for said first and second digital signals, respectively;
   storing either one of said first and second digital signals for a predetermined duration which includes the respective one of said editing points;
   mixing the stored digital signals and the reproduced digital signals so as to be cross-faded by gradually decreasing the value of said first digital signals while concurrently gradually increasing the value of said second digital signals commencing at their respective editing points;
   recording the mixed digital signals on said first recording medium; and
   recording said second digital signals on said first recording medium subsequent to said mixed digital signals which form a discontinuity-free transition between said first and second digital signals recorded on said first recording medium.

3. Method of claim 1, further comprising the steps of: prerolling said first and second recording mediums for predetermined intervals before the respective editing points; and driving the prerolled first and second recording mediums so as to be synchronized as to frame during an editing operation.

4. Method of claim 3, wherein said step of prerolling said first and second recording mediums includes controlling said first and second recording mediums such that said second recording medium is prerolled a predetermined number of frames longer than said first recording medium.

5. Method of editing digital signals which are composed of successive frames with a plurality of words included in each frame, said method comprising the steps of:
reproducing first digital signals from a first recording medium;
reproducing second digital signals from a second recording medium;
determining editing points for said first and second digital signals, respectively;
prerolling said first and second recording mediums for predetermined intervals before the respective editing points;
driving the prerolled first and second recording medium so as to be synchronized as to frame during an editing operation;
detecting the number of words constituting the difference between the editing points of said first and second recording mediums during the synchronous driving of said first and second recording mediums;
delaying either one of said first and second digital signals in response to the detected number of words constituting said difference such that the editing point of said first digital signals is made to coincide, in time, with that of said second digital signals;
storing either one of said first and second digital signals for a predetermined duration which includes the respective one of said editing points;
recording the stored digital signals at least in the neighborhood of said respective editing point on said first recording medium; and
recording said second digital signals on said first recording medium subsequent to said stored digital signals so that the latter form a discontinuity-free transition between said second digital signals and said first digital signals as recorded on said first recording medium.

6. Apparatus for editing digital signals which are composed of successive frames with a plurality of words included in each frame, said apparatus comprising:
first means for reproducing first digital signals from a first recording medium;
second means for recording the reproduced first digital signals on a second recording medium on which second digital signals are already recorded;
means for determining first and second edit points for the first and second digital signals, respectively;
memory means for storing said first digital signals reproduced from said first means for a predetermined duration which includes said first edit point; and
control means for controlling said first and second means and said memory means such that the stored first digital signals, commencing at said first edit point, are recorded on said second recording medium subsequent to said second edit point of said second digital signals to provide a discontinuity-free transition between said second digital signals and the reproduced first digital signals recorded on said second recording medium.

7. Apparatus of claim 6, wherein said control means includes recording medium controlling means for prerolling said first and second recording mediums for predetermined intervals before the respective edit points, and driving the prerolled first and second recording mediums so as to be synchronized as to frame during an editing operation.

8. Apparatus for editing digital signals which are composed of successive frames with a plurality of words included in each frame, said apparatus comprising:
first means for reproducing first digital signals from a first recording medium;
second means for recording the reproduced first digital signals on a second recording medium on which second digital signals are recorded;
means for determining first and second edit points for the first and second digital signals, respectively;
memory means for storing said first digital signals reproduced from said first means for a predetermined duration which includes said first edit point;
control means for controlling said first and second means and said memory means such that the stored first digital signals, commencing at said first edit point, are recorded on said recording medium subsequent to said second edit point of said second digital signals, said control means including recording medium controlling means for prerolling said first and second recording mediums for predetermined intervals before the respective edit points, and driving the prerolled first and second recording mediums so as to be synchronized as to frame during an editing operation;
constituting the difference between the edit points; and
means for compensating for said difference by delaying said reproduced first digital signals said detected number of words.

9. Apparatus of claim 8, wherein said compensating means comprises second memory means, and said reproduced first digital signals are read out from said second memory means to said second means.

10. Apparatus of claim 9, further comprising means for decoding the reproduced first digital signals to provide decoded first digital signals which are supplied to said second memory means; and
means for encoding said decoded first digital signals from said second memory means to provide encoded first digital signals which are supplied to said second means.

11. Apparatus of claim 10, further comprising;
means for detecting a delay time of said first digital signals in said decoding means and said encoding means,
register means for memorizing said delay time, and
means for advancing the reading out of said first digital signals from the first-mentioned memory means in response to said delay time.

12. Apparatus for editing digital signals which are composed of successive frames with a plurality of words included in each frame, said apparatus comprising:

first means for reproducing first digital signals from a first recording medium;

second means for recording the reproduced first digital signals on a second recording medium on which second digital signals are recorded;

means for determining first and second edit points for the first and second digital signals, respectively;

memory means for storing said first digital signals reproduced from said first means for a predetermined duration which includes said first edit point;

control means for controlling said first and second means and said memory means such that the first digital signals, commencing at said first edit point, are recorded on said recording medium subsequent to said second edit point of said second digital signals; and mixing circuit means for mixing with the reproduced first digital signals supplied from said memory means to said second means a gradually decreasing value of said second digital signals while concurrently gradually increasing the value of said first digital signals.

* * * * *